C. J. WATTS & F. J. EBERLE.
MILLING MACHINE.
APPLICATION FILED JAN. 30, 1911.

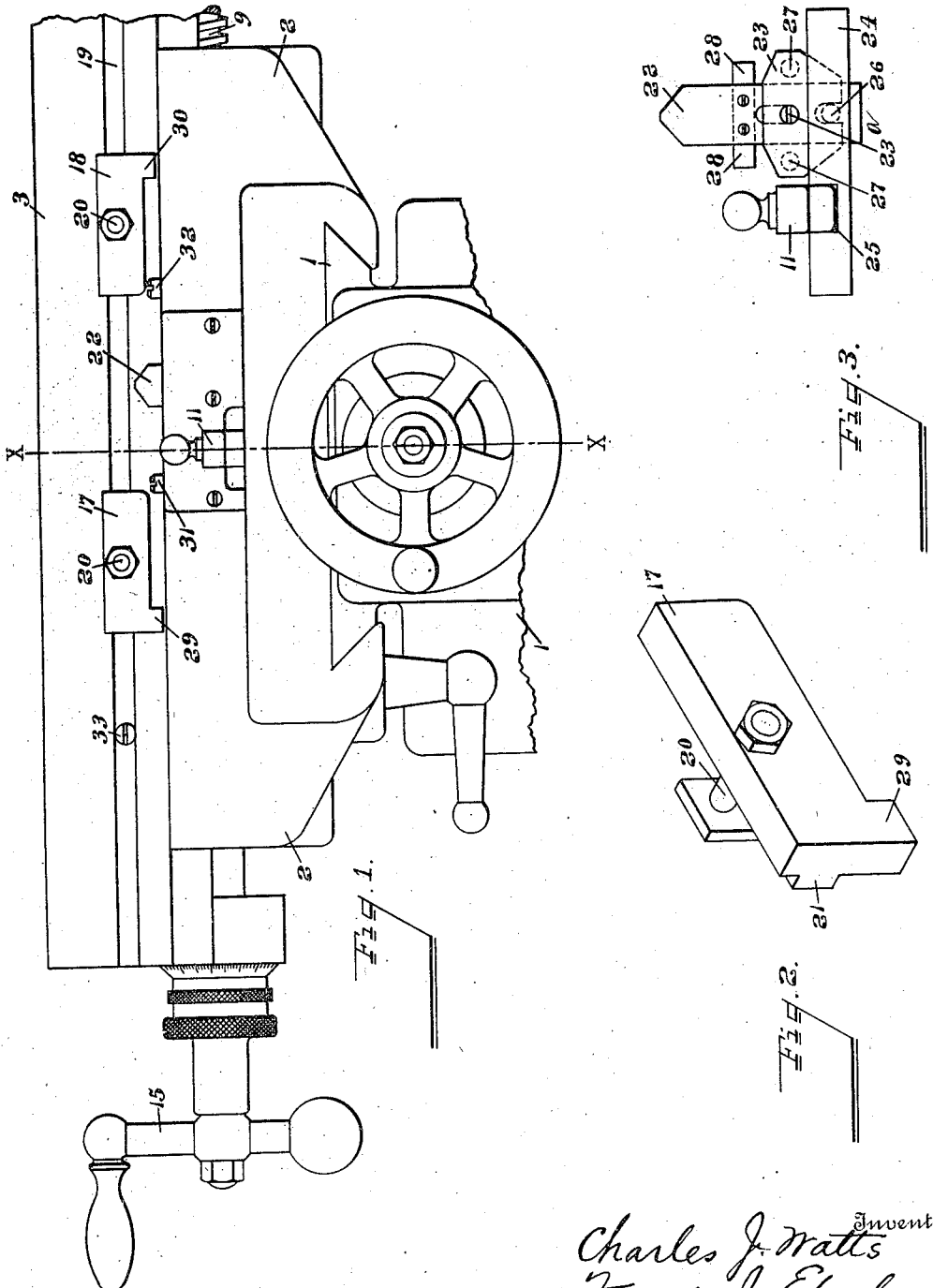

1,023,184.

Patented Apr. 16, 1912.

2 SHEETS—SHEET 2.

Witnesses
Oliver T. Clarke
Chas. J. Welch

Inventors
Charles J. Watts
Frank J. Eberle

By Staley & Bowman
Attorneys

UNITED STATES PATENT OFFICE.

CHARLES J. WATTS AND FRANK J. EBERLE, OF SPRINGFIELD, OHIO, ASSIGNORS TO THE OWEN MACHINE TOOL COMPANY, OF SPRINGFIELD, OHIO, A CORPORATION OF OHIO.

MILLING-MACHINE.

1,023,184. Specification of Letters Patent. Patented Apr. 16, 1912.

Application filed January 30, 1911. Serial No. 605,562.

*To all whom it may concern:*

Be it known that we, CHARLES J. WATTS and FRANK J. EBERLE, citizens of the United States, residing at Springfield, in the county of Clark and State of Ohio, have invented certain new and useful Improvements in Milling-Machines, of which the following is a specification.

Our invention relates to improvements in milling machines, and it particularly relates to the devices for tripping and stopping the feed of the work table.

In milling machines it has been customary to provide for throwing out of operation the power feeding devices for the work table near the limit of the movement of the table in either direction and then complete the feed of the table by hand for the purpose of enabling the operator to obtain greater accuracy in the work. It is also customary to provide adjustable stops for the table to arrest the movement of the same when it has reached the desired limit of feed. As heretofore employed, these adjustable stops have been entirely separate and distinct from the tripping devices and it sometimes happens through carelessness of the operator that the hand stops are so adjusted that they will arrest the movement of the table prior to the time that the tripping devices operate to throw out the power feed, thereby causing breakage of the parts such as the stripping of the gears. It also sometimes occurs that the operator fails to securely fasten the tripping dogs, in which case they will slide in their groove-way and thus fail to trip the power feed with the result that the hand stop bars the movement of the table before the power feed is disengaged with the result above stated.

The object of our invention is to overcome this difficulty by providing a construction whereby it will be impossible to adjust the hand stops for the hand feed to a point in advance of the tripping devices for the power feed, this preferably being accomplished by providing a power tripping device and hand stops which are in fixed relation with each other, so that by adjusting the tripping devices for the power feeding mechanism to a certain point, the stops for the hand feed will be at the same time and by the same operation placed at the proper point to arrest the movement of the table without any attention upon the part of the operator.

Our invention consists in the construction and combinations of parts hereinafter shown and set forth in the claims.

Figure 4:
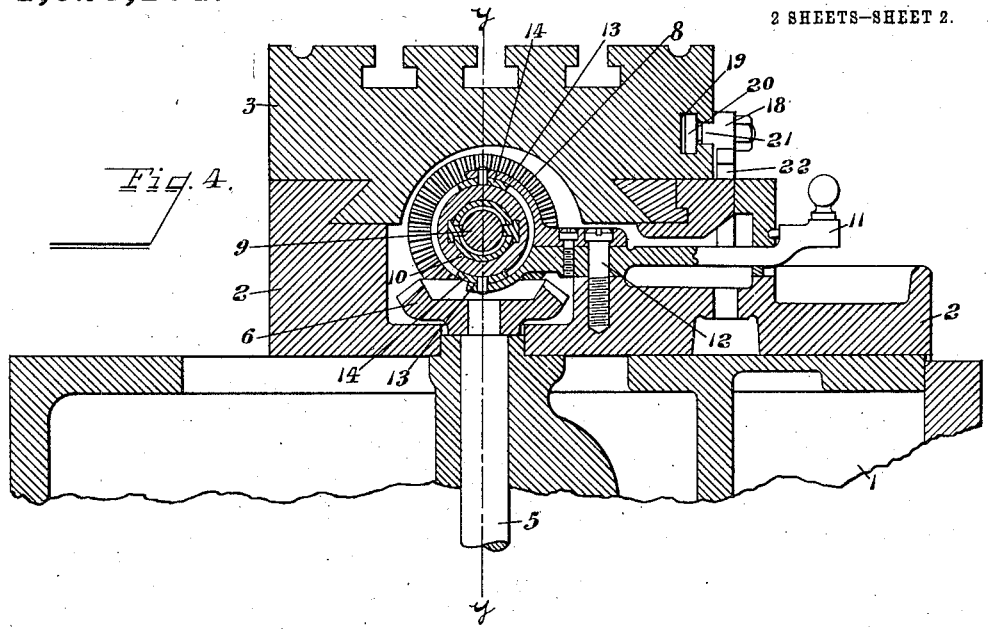
Figure 5:
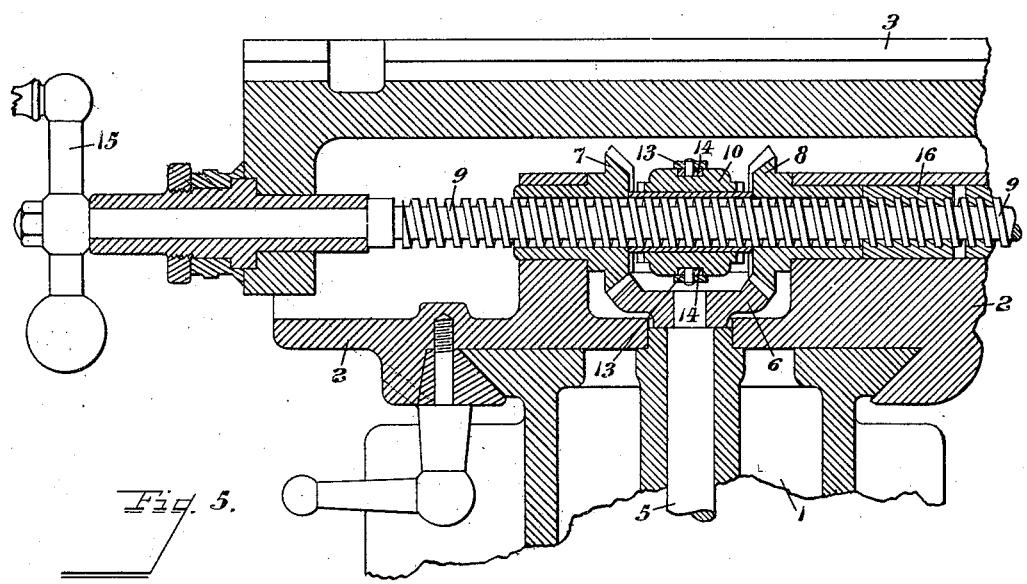

In the accompanying drawings: Figure 1 is a front elevation of so much of a milling machine as is deemed necessary to illustrate our invention. Fig. 2 is a detail of one of the tripping dogs and stops. Fig. 3 is a detail of some of the tripping devices. Fig. 4 is a transverse vertical section upon the line X—X of Fig. 1. Fig. 5 is a longitudinal section taken on the line Y—Y of Fig. 4.

Like parts are represented by similar characters of reference in the several views.

The milling machine which is illustrated in the drawing is of a well known type.

1 represents the knee which is arranged to be adjusted vertically upon the main frame of the machine in the usual way.

2 is the usual transversely movable saddle and 3 is the work table which is mounted upon the saddle and is longitudinally movable thereon by the feeding devices. But a portion of the feeding devices for the table have been shown, it being sufficient to say that the feeding devices in a machine of this character usually have a continuously driven vertical shaft which is represented by 5 in the drawings, this shaft being driven from any suitable source of power. The shaft has at its upper end a beveled gear 6 meshing with the beveled pinions or gears 7 and 8, encircling the feed screw 9, the hubs of which are mounted in bearings in the saddle 2. Arranged between the beveled gears 7 and 8 and splined to the feed screw 9 is the usual shiftable clutch 10, arranged to be shifted into engagement with either one of said gears 7 and 8 by the shifting lever 11, pivoted to the stud 12 and having a yoke 13 which is pivotally connected to shoes 14 which extend into a groove-way formed about the clutch.

15 is the usual crank connected to one end of the feed screw 9 for feeding the table by hand when it is desired. It will be understood that the feed screw passes through the screw-threaded nut 16 which is secured to the saddle 2 so that as the screw is revolved it will be moved longitudinally and carry with it the table in a manner which is common.

17 and 18 are tripping dogs which are adapted to be secured in any position of adjustment in a T-slot 19, extending longitudinally in the front of the table, by T-bolts 20; the rear face of the dogs having a tongue or rib 21 which extends into the slot for the purpose of holding the dogs in position. As the table nears the limit of its movement, one of these dogs contacts one of the beveled faces of the spring-pressed plunger 22 and depresses the same. Previous to this, however, the throwing of the clutch lever 11 from neutral position to engage the clutch 10 with one of the beveled gears 7 and 8 as previously described has caused a plate 23 to be tilted through the medium of the link 24, loosely connected, respectively, to the said lever and plate; said link 24 having a slot or recess 25 which receives the lever and also a pin 26 which extends through the central recess in the lower part of the plate 23; said plate being pivoted to the pin 23ª. The swinging of the plate 23 brings either one of the pins 27 thereon into the path of movement of one of the pins 28 projecting laterally from the plunger 22 so that, as the plunger is depressed by the dog, the contact of the respective pins will swing the plate 23 back to its neutral position, thereby causing the disengagement of the clutch and the stopping of the power feed. After the power feed has been disconnected from the table, the table is then free to be fed for the balance of its movement by the hand feed previously referred to. Heretofore it has been customary to have adjustable stops arranged at any convenient point on the table, the most common practice being to connect these stops at the ways at each end of the table and have them contact with the respective ends of the saddle, the adjustment of these stops being quite independent of the adjustment of the tripping dogs. In our improved device we have formed these stops integral with the dogs 17 and 18 by providing on the rear ends of said dogs downwardly extending projections 29 and 30 adapted to coöperate with fixed stops 31 and 32 extending up from the saddle 2. The relation of the parts is such that after either one of the dogs has completed its tripping operation, the stop associated with said dog will be in such position with respect to the fixed stop, 31 or 32, as to permit the table to be fed by hand a further distance of, say, one-fourth of an inch. By this construction it will be seen that by the adjustment of the dogs 17 and 18 to proper tripping position, the proper adjustment of the stops 29 and 30 will likewise be performed without any attention whatever on the part of the operator, thus obviating the difficulty heretofore explained in connection with the old form of tripping devices and stops.

If desired each machine may be supplied with any number of sets of dogs having the stops arranged at varying distances from the tripping ends of the dogs so that the operator, by using the proper dog, may provide for a feed by hand of any desired length to suit his own ideas or the conditions of the work.

When the operator, in adjusting the dogs, fails to securely fasten them in the grooveway so that the dog which contacts the plunger, instead of depressing the plunger, will slide along the groove-way and out of the end thereof, thus causing the table to become jammed. To obviate this we provide at a suitable point in the groove-way a stop 33, which may be in the nature of a screw inserted in a screwthreaded opening in the wall of the table with the head thereon projecting into the groove-way; one of the screws being located at each end of the groove-way. The dog, in contacting the stop, will be arrested and cause the depression of the plunger and consequently the disengagement of the feeding mechanism and the consequent stoppage of the table.

Having thus described our invention, we claim:

1. In a milling machine, a movable table, power feeding mechanism for said table, hand feeding mechanism for said table, adjustable devices for throwing said power feeding mechanism out of operation, adjustable stops for limiting the hand feeding movement of said table, the arrangement and relation of said adjustable throw-out devices and said stops being such as to compel an adjustment of the same such as will cause said power feeding mechanism to be thrown out of engagement prior to the stoppage of the table by said stops.

2. In a milling machine, a movable table, a power feeding mechanism for said table, hand feeding mechanism for said table, two adjustable devices for throwing said power feeding mechanism out of operation, two adjustable stops for said table, said throw-out devices and stops being arranged in pairs with one throw-out device and one stop to each pair, the throw-out device and stop of the same pair being so positioned and related with respect to each other that the setting of the stop in advance of the throw-out device is prevented, substantially as specified.

3. In a milling machine, a movable table, power feeding mechanism for said table, hand feeding mechanism for said table, throw-out devices for said power feeding mechanism and stops for said hand feeding mechanism adjustably secured to said table and arranged in pairs, one throw-out device and one stop to a pair, the throw-out device and stop of each pair being so arranged with respect to each other that they may be adjusted simultaneously and the setting of the stop in advance of the throw-out device prevented, substantially as specified.

4. In a milling machine, a movable table, power feeding mechanism for said table, hand feeding mechanism for said table, adjustable dogs on said table for throwing said power feeding mechanism out of operation, adjustable stops for limiting the movement of said table, said dogs and stops being arranged in two pairs with one dog and one stop to each pair, the dog and stop of each pair being integrally connected together with the dog in advance of the stop, for the purpose specified.

5. In a milling machine, a movable table, a power feeding mechanism for said table, adjustble tripping devices on said table for said power feeding mechanism together with devices for adjustably securing said tripping devices in position, and stops also located on said table for said tripping devices, substantially as and for the purpose specified.

6. In a milling machine, a movable table, power feeding mechanism for said table, a groove-way in said table, adjustable dogs for tripping said power feeding mechanism, together with devices for securing the same in position in said groove-way, and stops on said table for said dogs, substantially as specified.

In testimony whereof, we have hereunto set our hands this 24th day of January, 1911.

CHARLES J. WATTS.
FRANK J. EBERLE.

Witnesses:
OLIVER T. CLARKE,
CHAS I. WELCH.

---

Copies of this patent may be obtained for five cents each, by addressing the "Commissioner of Patents, Washington, D. C."